A. FÖRSTER.
RAILWAY SIGNALING APPARATUS.
APPLICATION FILED JULY 20, 1908.

990,971.

Patented May 2, 1911.

Witnesses:
S. M. McColl,
J. R. Pierce.

Inventor:
A. Förster.
by A. B. Willson & Co.
Attorneys.

UNITED STATES PATENT OFFICE.

ARTHUR FÖRSTER, OF GÖRLITZ, GERMANY.

RAILWAY SIGNALING APPARATUS.

990,971. Specification of Letters Patent. Patented May 2, 1911.

Application filed July 20, 1908. Serial No. 444,346.

*To all whom it may concern:*

Be it known that I, ARTHUR FÖRSTER, a subject of the German Emperor, and residing at 11 Jüdenstrasse, Görlitz, Germany, have invented certain new and useful Improvements in Railway Signaling Apparatus, of which the following is a specification.

This invention has for its object to provide improved railway signaling apparatus of the kind whereby the engine driver may be notified at a predetermined distance before reaching a track signal of the fact that the said track signal is at "danger".

Figure 1:
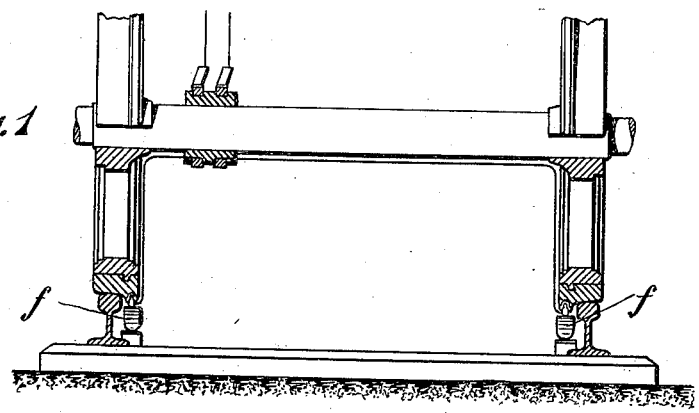
Figure 2:
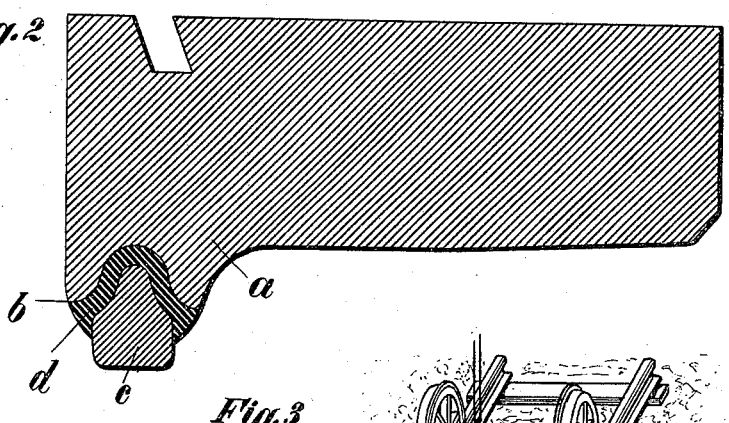
Figure 3:
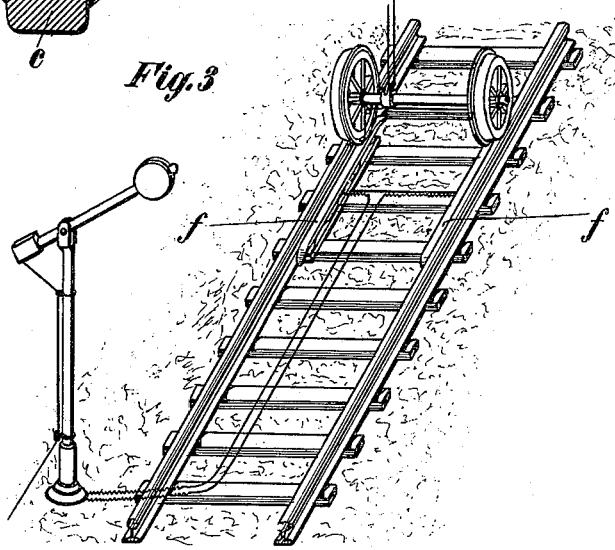

In the accompanying drawings: Figure 1 is an elevation partly in vertical section of an axle of a railway vehicle with the parts constituting the present improvements; and Fig. 2 is a radial section of the tire of one of the wheels of the aforesaid axle, shown separately on a much larger scale. Fig. 3 is a diagrammatic perspective view illustrating all the parts embodying this invention.

$f$ are the contact rails, mounted on yielding bearings between the track rails.

$a$ are the flanges of the wheels on the vehicle axle. Each flange $a$ is formed with a peripheral groove $b$ for the reception of insulating material $d$ and of a contact ring $c$, arranged over the insulating material $d$. Each contact ring $c$ is connected to a slip ring $e$ arranged on the wheel axle, and this slip ring is connected to the alarm on the engine.

Owing to the greater periphery of the wheel flange $a$ carrying the contact ring $c$, in relation to the periphery of the wheel tread, the contact between the contact ring $c$ and the contact rail $f$ will be attended with a certain amount of friction which insures an excellent electrical contact with but slight wear.

The contact rails $f$ are electrically connected with the track signal in such a manner that they are out of circuit when the track signal is set at "line clear", and they are traversed by the current when the track signal is set at "danger". In the latter case the current will pass through the contact rings $c$ in the wheel flanges $a$ and will operate an alarm located in the engine cab or in the guard's van.

Having now described my invention, what I claim as new and desire to secure by Letters Patent is:—

In an electrical railway signaling apparatus, the combination with the track rails, a visual track signal, and a railway vehicle axle having wheels running on said track rails, of a normally interrupted conductor adapted to be closed at its interrupted portion by the setting of said track signal to "danger", short insulated contact rail terminals extending alongside said track rails and forming the terminals of said conductor, insulated contact ring terminals let into the edges of the flanges of said wheels and forming the terminals of the vehicle portion of an electrical alarm circuit and adapted to run on said contact rail terminals, insulated slip rings on said axle, and means of electrical connection between said slip rings and said contact ring terminals whereby when the track portion of said electrical alarm circuit is closed by the set of the track signal at "danger", said contact ring terminals in running on to said contact rail terminals will complete said electrical alarm circuit.

In testimony whereof I have hereunto set my hand in presence of two subscribing witnesses.

ARTHUR FÖRSTER.

Witnesses:
ERNST KATZ,
GUSTAV GRÜNDER.

---

Copies of this patent may be obtained for five cents each, by addressing the "Commissioner of Patents, Washington, D. C."